US009547520B1

(12) United States Patent
Bailey et al.

(10) Patent No.: US 9,547,520 B1
(45) Date of Patent: Jan. 17, 2017

(54) VIRTUAL MACHINE LOAD BALANCING

(71) Applicant: International Business Machines Corporation, Armonk, NY (US)

(72) Inventors: Christopher N. Bailey, Southampton (GB); Alexander J. Kelly, Romsey (GB); Alexander D. S. Mirski-Fitton, Chandlers Ford (GB); Edwin P. J. Moffatt, Winchester (GB); Ross B. Pavitt, Headley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/865,011

(22) Filed: Sep. 25, 2015

(51) Int. Cl.
*G06F 9/45* (2006.01)
*G06F 9/455* (2006.01)

(52) U.S. Cl.
CPC ... *G06F 9/45558* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 8,234,378 | B2 | 7/2012 | Stephens et al. | |
|---|---|---|---|---|
| 2003/0056076 | A1* | 3/2003 | Cook | G06F 9/5016 711/173 |
| 2005/0188163 | A1* | 8/2005 | Asthana | G06F 8/62 711/159 |
| 2007/0136402 | A1* | 6/2007 | Grose | G06F 12/0253 |
| 2007/0162526 | A1* | 7/2007 | Printezis | G06F 9/4843 |
| 2009/0300092 | A1* | 12/2009 | Corry | G06F 9/505 709/202 |

(Continued)

FOREIGN PATENT DOCUMENTS

| CN | 103514102 A | 1/2014 |
|---|---|---|
| EP | 1717706 A1 | 11/2006 |

OTHER PUBLICATIONS

Portillo-Dominguez et al., "Load Balancing of Java Applications by Forecasting Garbage Collections", 2014 13th International Symposium on Parallel and Distributed Computing, Date of Conference: Jun. 24-27, 2014, © 2014 IEEE, pp. 127-134, <http://ieeexplore.ieee.org/xpl/login.jsp?tp=&arnumber=6900210&url=http%3A%2F%2Fieeexplore.ieee.org%2Fxpls%2Fabs_all.jsp%3Farnumber%3D6900210>.

(Continued)

*Primary Examiner* — Sisley Kim
(74) *Attorney, Agent, or Firm* — Christopher McLane (57) ABSTRACT

The method includes estimating an amount of unused memory in a memory allocation of one or more virtual machines based on a data associated with one or more applications previously dispatched to the one or more virtual machines. The method includes receiving a request for executing a new application. The method includes estimating an amount of memory utilized by one of the one or more virtual machines to execute the new application. The method includes dispatching the new application to one of the one or more virtual machine having an amount of unused memory exceeding the estimated amount of memory required to execute the new application. The method includes updating the data associated with the one or more applications previously dispatched to the one or more virtual machines by adding an identifier of the new application to the data.

20 Claims, 6 Drawing Sheets

(56) References Cited

U.S. PATENT DOCUMENTS

2014/0038718 A1* 2/2014 Kothari .............. G06F 9/44526
463/40

OTHER PUBLICATIONS

Portillo-Dominguez et al., "Adaptive GC-Aware Load Balancing Strategy for High-Assurance Java Distributed Systems", 2015 IEEE 16th International Symposium on High Assurance Systems Engineering, Date of Conference: Jan. 8-10, 2015, © 2015 IEEE, pp. 68-75.

IBM, "Method to schedule workload based on JVM garbage collection activity", An IP.com Prior Art Database Technical Disclosure, Original Publication Date: Sep. 30, 2006, IP.com No. 000141083, 8 pages, <https://priorart.ip.com/IPCOM/000141083>.

* cited by examiner

VIRTUAL MACHINE LOAD BALANCING

BACKGROUND

The present invention relates to a computer-implemented method of managing a computer system comprising a processor arrangement adapted to host a plurality of virtual machines and computer systems adapted to implement such a method.

In computing, a virtual machine (VM) is an emulation of a particular computer system. Virtual machines operate based on the computer architecture and functions of a real or hypothetical computer, and the computer's implementations may involve specialized hardware, software, or a combination of both.

Different virtualization techniques are used, based on the desired usage. Native execution is based on direct virtualization of the underlying raw hardware, thus it provides multiple "instances" of the same architecture a real machine is based on, capable of running complete operating systems. Some virtual machines can also emulate different architectures and allow execution of software applications and operating systems written for another CPU or architecture. Operating-system-level virtualization allows the resources of a computer to be partitioned via kernel's support for multiple isolated user space instances, which are usually called containers and may look and feel like real machines to the end users.

SUMMARY

Embodiments of the present invention disclose a method, computer program product, and system for managing a computer system. In one embodiment, in accordance with the present invention, the computer-implemented method includes estimating, by one or more computer processors, an amount of unused memory in a memory allocation of one or more virtual machines based on a data associated with one or more applications previously dispatched to the one or more virtual machines. The method further includes receiving, by one or more computer processors, a request for executing a new application. The method further includes estimating, by one or more computer processors, an amount of memory utilized by one of the one or more virtual machines to execute the new application. The method further includes identifying, by one or more computer processors, one or more virtual machines having an amount of unused memory exceeding the estimated amount of required memory to execute the new application. The method further includes dispatching, by one or more computer processors, the new application to one of the one or more virtual machine having an amount of unused memory exceeding the estimated amount of memory required to execute the new application. The method further includes updating, by one or more computer processors, the data associated with the one or more applications previously dispatched to the one or more virtual machines by adding an identifier of the new application to the data.

DETAILED DESCRIPTION

Embodiments, of the present invention recognize that virtual machines (VMs) such as Java™ virtual machines (JVMs) are well-known abstract computing machines, which when run on a computer system such as a server environment, implement a set of functions or services provided by the computer system. During execution, the VMs execute requests for such functions of services by creating tasks or objects, with the VM reserving a (contiguous) portion of its so-called heap memory to store and retrieve data associated with an active task or object. Such data may remain in the system memory after completion of the task or object, where it blocks available memory resources as the memory locations storing this data are not recognized as being available. Such stale data is commonly referred to as garbage, which periodically needs to be removed from the heap memory to free up memory for new tasks or objects.

During garbage collection, the VM typically pauses the VM's in-flight workload (i.e. active tasks or objects), which therefore delays the completion of the workload. This may not be acceptable for time-critical tasks or objects. In order to avoid tasks or objects being delayed, a system may deploy load balancing techniques in which new tasks or objects are not assigned to unavailable VMs to avoid the risk of new tasks and objects being delayed. The performance penalty associated with garbage collection can be reduced by reducing the size of heap memory, as it will take less time to collect garbage from a smaller memory allocation. This limits the amount of data that a single VM can execute and may therefore require a large number of VMs to be deployed if large volumes of data require executing, which can cause performance degradation due to communication overheads between VMs. It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer or computer system, i.e. is a computer-implementable method. The various steps of the method therefore reflect various parts of a computer program, e.g., various parts of one or more algorithms.

In the context of the present application, where reference is made to a virtual machine, this is intended to describe a software implementation of a machine (for example, a computer) that executes programs, e.g., applications, like a physical machine. In an embodiment, the virtual machine is a Java™ Virtual Machine (JVM) although the present invention is not limited thereto. A virtual machine is typically hosted on a computer system, that is, executed on a processor arrangement of the computer system, with the virtual machine having been assigned an allocation of memory of the computer system, e.g., system memory, which allocation may be used by the virtual machine to store data associated with the execution of one or more programs, e.g., applications, by the virtual machine. Such an allocation will also be referred to as heap memory.

Figure 1:
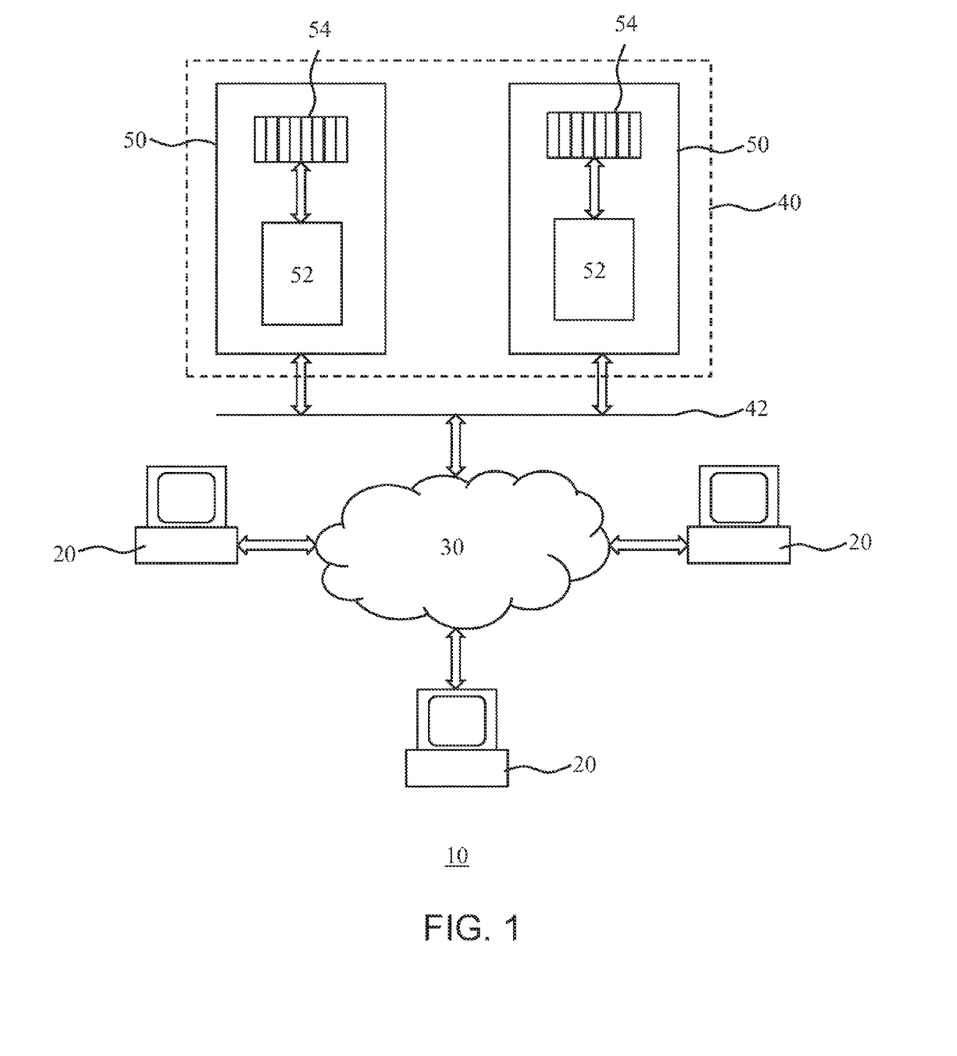
FIG. 1 is a functional block diagram illustrating a distributed data processing environment, in accordance with an embodiment of the present invention.

FIG. 1 schematically depicts a network environment 10 in which embodiments of the present invention may be advantageously deployed. Network environment 10 may contain a number of client devices 20 that can connect to a computer system 40 over a network 30.

Each client device 20 may be at least one of a variety of conventional computing devices, including a desktop personal computer (PC), workstation, mainframe computer, Internet appliance, and set-top box. Further, client device 20 may be at least one of any device that is capable of being associated with network 30 by a wired and/or wireless link, including a personal digital assistant (PDA), laptop computer, cellular telephone, and so on. It should be understood that three client devices 20 are shown by way of non-limiting example only; network environment 10 may include client devices 20 described above in various quantities and/or combinations thereof.

Network 30 may represent any of a variety of conventional network topologies and types, which may include wired and/or wireless networks. Network 30 may further utilize any of a variety of conventional network protocols, including public and/or proprietary protocols. Network 30 may include, for example, the Internet as well at least portions of one or more local area networks (also referred to, individually, as a "LAN"); a personal area network (i.e., PAN).

The computer system 40 may be any type of computer system that can be accessed by a client device 20 over a network 30. The computer system 40 may be a standalone computer 50, e.g., a standalone server, or may contain a plurality of such computers 50, which may be spatially clustered, e.g., within a single computer housing, within a server rack, within a plurality of adjacent server racks in a space such as a data center, and so on, or may be spatially distributed. Where computer system 40 comprises one or more computers 50 acting as servers, each computer 50 may be individually one of a network server, an application server, or a blade server and so on. Two or more networked servers may share in the execution of at least portions of a same application, program, function, or other assemblage of programmable and executable code.

As will be explained in more detail below, one or more computers 50 are at least configured to execute computer program code causing computers 50 to host one or more virtual machines, such as JVMs. To this end, each computer 50 typically comprises a processor arrangement 52 that is communicatively coupled to a computer memory 54.

The processor arrangement 52 may be a single processor or a cluster or otherwise grouped collection of processors, which may be any suitable type of processor, e.g., a single core processor, a multi-core processor, an application specific integrated circuit (ASIC) and so on.

Computer memory 54 may be embodied by any suitable data storage device, such as a volatile memory, a non-volatile memory, a flash memory, a solid state memory, and so on. Computer memory 54 may be a contiguous memory contained in a single memory device, or a distributed memory distributed over multiple memory devices, which multiple memory devices may be spatially clustered or spatially distributed over computer system 40, e.g., physically located in different entities of computer system 40, e.g., physically located in different computers 50.

In case of multiple computers 50 forming part of computer system 40, computers 50 may be connected to network 30 via a further network 42, e.g., an internal network such as a local area network, a wide area network, and so on, which may be a physical network comprising wires over which computers 50 communicate with network 30 or may at least partially be a wireless network employing any suitable wireless communication protocol.

Figure 2:
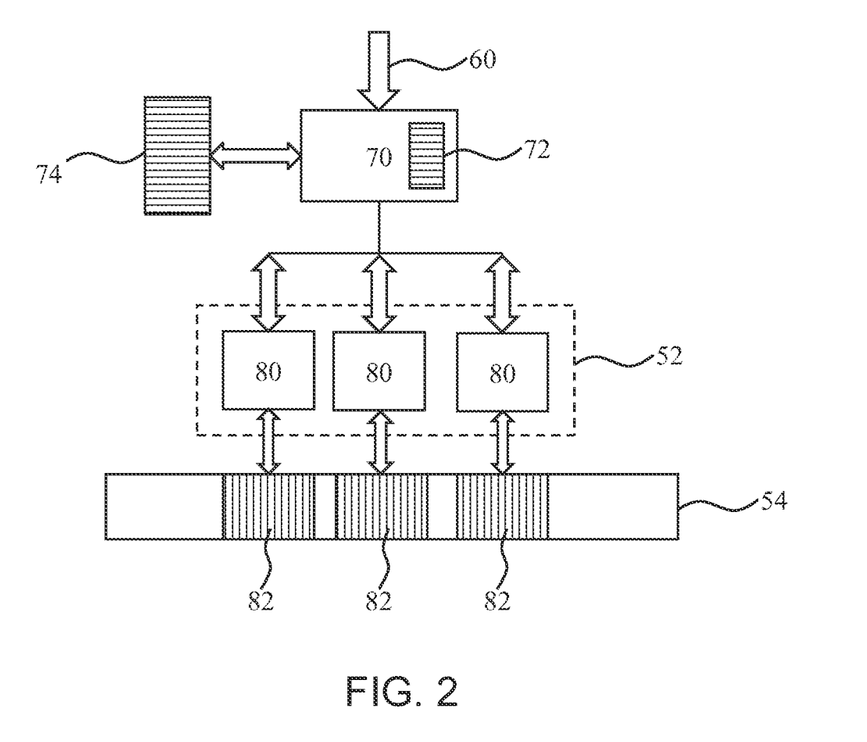
FIG. 2 depicts an operating principle of a computer system according to an embodiment of the present invention.

FIG. 2 schematically depicts an application layer according to an embodiment, which application layer is hosted on computer system 40. In the application layer, computer system 40 implements an execution environment comprising a plurality of virtual machines 80 under control of load balancer 70 after receiving request 60. A plurality of virtual machines 80 are typically hosted by one or more processor arrangements 52 of one or more computers 50 of computer system 40 as described above. In an embodiment, the virtual machines are JVMs.

Each virtual machine 80 is typically allocated a portion of memory heap 82 of the system memory 54, such as a contiguous portion of memory heap 82. The allocation portion of memory heap 82 of system memory 54 is used by virtual machine 80 as a memory heap for storing data associated with the execution of one or more applications by virtual machine 80. The size of the allocation, i.e. the portion of memory heap 82, may be decided in any suitable manner. For example, the size of the allocation may be encoded in the computer program code of virtual machine 80, such that processor arrangement 52 executing the computer program code in the process of hosting virtual machine 80 will dynamically reserve the memory heap in system memory 50. That is, when launching virtual machine 80 by retrieving the size of the allocation from the computer program code and requesting a reservation of a portion of system memory 50 of corresponding size. Alternatively, the size of the allocation may be determined at run-time, e.g., by load balancer 70, for instance based on system memory utilization, e.g., due to the number of virtual machines 80 being hosted. Other suitable ways of determining and assigning the size of the memory heap will be immediately apparent to those of ordinary skill in the art.

During operation, each virtual machine 80 assigns a portion of memory heap 82 to an application it is requested to execute, e.g., an application dispatched to virtual machine by load balancer 70. In this manner, the capacity of memory heap 82 is gradually consumed by the applications executed by virtual machine 80. Upon completion of the execution of an application, the data in memory heap 82 associated with the execution of the application may remain in memory heap 82 even though the data is no longer referenced by an active application. Such data is sometimes referred to as stale data. The stale data needs to be removed from memory heap 82 in order to free up memory for the execution of new applications. This is typically done in a process referred to as garbage collection.

During garbage collection, the execution of active applications on virtual machine 80 is halted or paused, thus delaying the completion of the execution of these applications. This can be unwanted in situations where these applications are to produce time-critical data, where the delay in the production of this data may compromise the accuracy of such data.

Load balancer 70 is configured to try and minimize the number of applications which execution needs to be paused due to virtual machine 80 of load balancer 70 performing the execution requiring garbage collection in order to free up memory heap 82 of virtual machine 80.

Load balancer 70 may be implemented in software on processor arrangement 52, e.g., on the same one or more processors hosting one or more virtual machines 80 or on a separate processor, which may be a dedicated processor for implementing load balancer 70. Alternatively, load balancer 70 may be implemented in part in hardware, i.e. by way of hardware/software co-design or in its entirety in hardware, for instance using conventional hardware building blocks, e.g., logic gates, registers and so on. In an embodiment, the load balancer 70 is implemented by the execution of computer program code on processor arrangement 52 of computer system 40.

Figure 4:
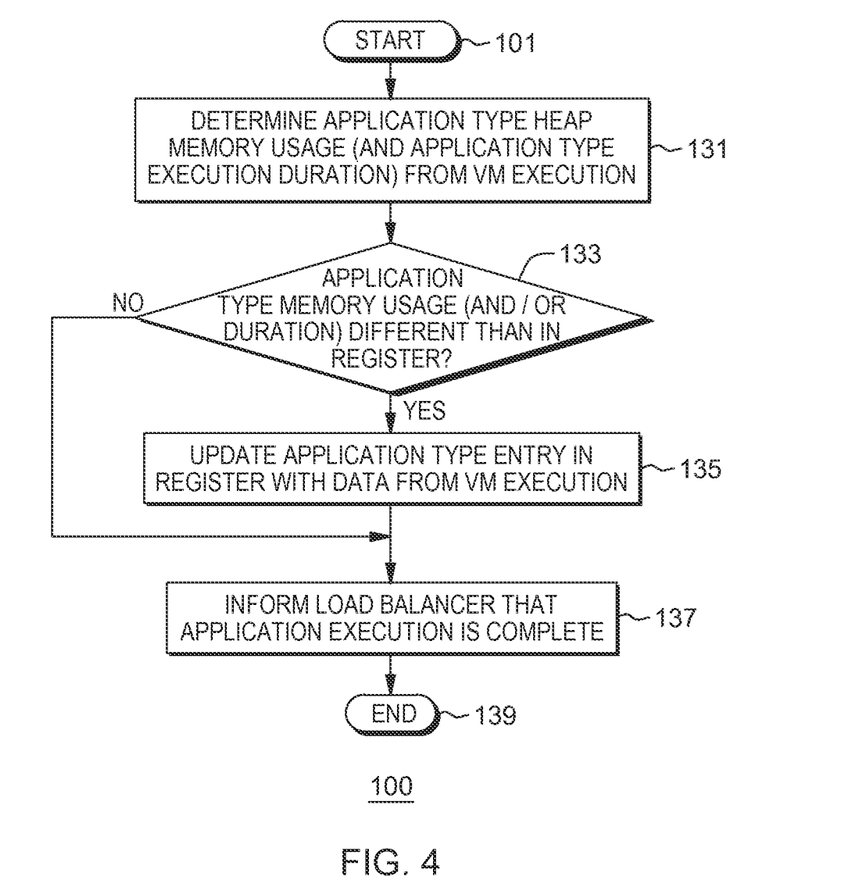
FIG. 4 is a flow chart of another aspect of a load balancing method according to an embodiment of the present invention.
Figure 5:
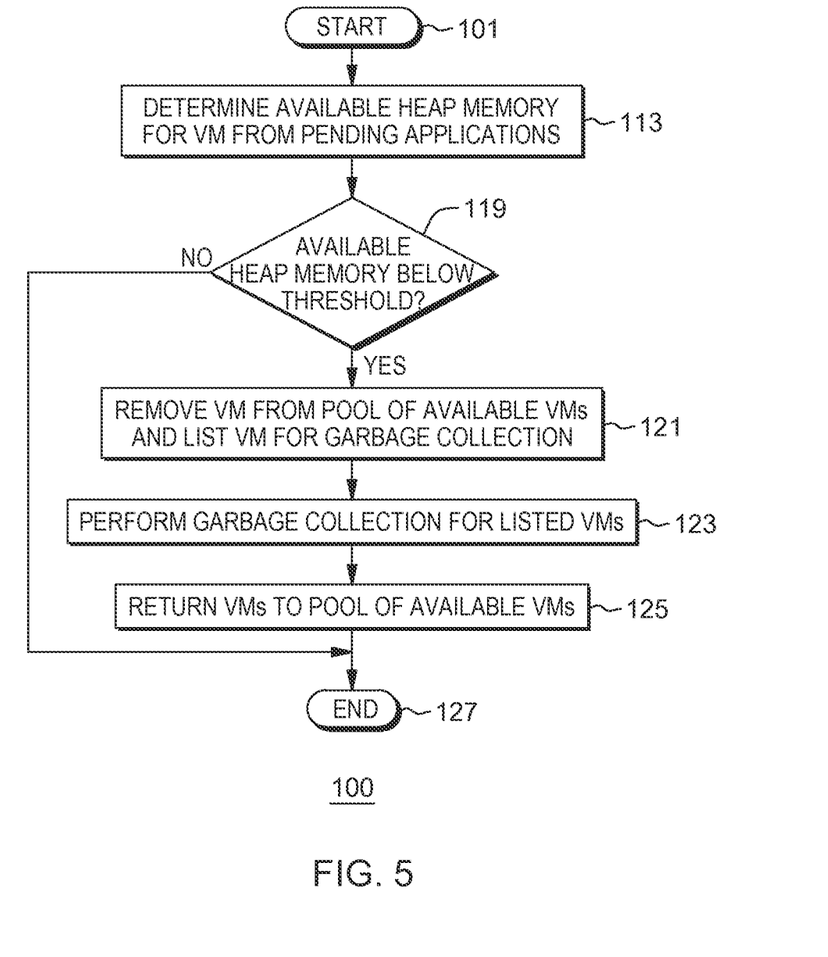
FIG. 5 is a flow chart of yet another aspect of a load balancing method according to an embodiment of the present invention.

The operation of load balancer 70 according to at least some embodiments will be explained in further detail with the aid of FIG. 3-5, each showing a flowchart of a particular aspect of the operation of the load balancer 70 including operations invoked by load balancer 70.

Load balancer 70 is adapted to maintain data associated with the active applications dispatched to the each of the one or more virtual machines 80, such as a log 72 of active applications dispatched to the each of the one or more virtual machines 80, which may include applications in execution on virtual machine 80 and applications queuing for execution by virtual machine 80. In the context of the present application, a log or register may be any suitable data structure for identifying the active or past applications dispatched to the each of the one or more virtual machines 80. Log 72 may be stored in a data storage device, e.g., a portion of system memory 54 or a separate memory, e.g., a cache memory of processor arrangement 52 hosting load balancer 70, and so on. Alternatively, each virtual machine 80 may keep log 72 of active applications dispatched to that virtual machine, with load balancer 70 configured to access respective logs 72, e.g., by communicating with virtual machine 80 to retrieve the required information.

Figure 3:
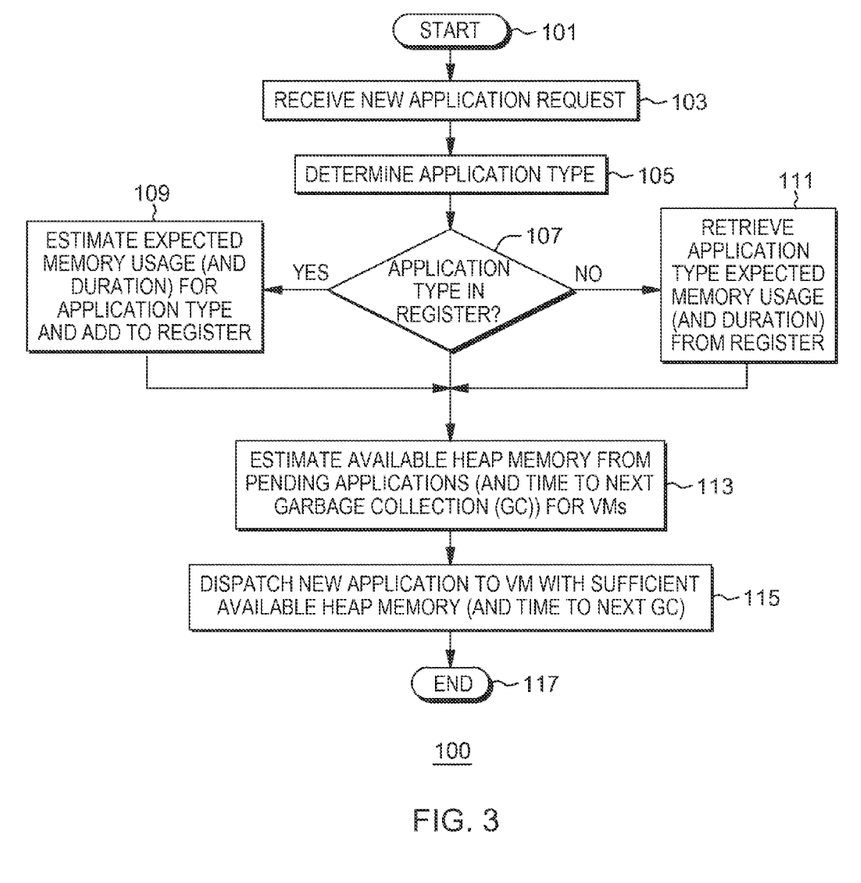
FIG. 3 is a flow chart of an aspect of a load balancing method according to an embodiment of the present invention.

FIG. 3 is a flow chart of a virtual machine load balancing method 100 implemented by load balancer 70. Method 100 launches in step 101 load balancer 70 and may subsequently receive in step 103 a request to execute a new application on one of the virtual machines 70.

The information obtained in step 103 is used to determine if a virtual machine 80 under investigation has sufficient space on memory heap 82 of virtual machine 80 to execute the new application, as will be explained in more detail below. This requires load balancer 70 to obtain an estimate of the expected memory usage by virtual machine 80 in the process of executing the new application. In an embodiment, load balancer 70 maintains a data structure such as register 74 in a list of application types that is stored, with each application type entry in register 74 comprising an indication of expected memory usage by virtual machine 80. An application type may be a group of applications sharing certain characteristics or may be a single application. Examples of application types include GET, POST, DELETE applications. Other examples will be immediately apparent to those of ordinary skill in the art. In the context of the present application, register 74 may be stored in any suitable form on any suitable data storage device, e.g., a dedicated register, a look-up table stored in system memory or in cache memory of a hardware device such as a processor implementing load balancer 70, and so on.

Load balancer 70 identifies the application type of the new application in step 105, e.g., from the name or any other suitable identifier of the requested application, after which it is checked in decision step 107 if the identified application type of the new application is already present in register 74. If the identified application type is present in register 74 (yes branch, decision step 107), the method 100 proceeds to step 111 in which the forecasted memory usage by an application of the identified application type is retrieved from register 74. On the other hand, if the identified application type is not present in register 74 (no branch, decision step 107), the method 100 proceeds to step 109 in which an estimate of the memory usage by an application of the identified application type is made, for instance by identifying a comparable application type in the register (e.g., by labeling each application in the register with its application type and matching the identified application type of the new application with register entries having the same application type. Using the forecasted memory usage by an application of the comparable application type as an estimate of the memory usage by an application of the identified application type, and by averaging the forecasted memory usages of all or a subset of the application types in the register 74 as an estimate of the memory usage by an application of the identified application type, and so on.) Other estimation approaches can be easily thought of by one of ordinary skill in the art. Once an estimate has been made of the memory usage by an application of the identified application type, the new application type and estimated memory of the new application type usage is added to register 74.

Next, the method proceeds to step 113 in which load balancer 70, for each virtual machine 80, estimates how much of memory heap 82 and virtual machine 80 is likely to have available for the execution of the new application. For example, load balancer 70 may investigate log 72 associated with virtual machine 80 under investigation to determine actual memory usage. A distinction can be made between application types having (approximately) static memory heap usage, i.e. usage of memory heap 82 that does not (significantly) change over time and application types having dynamic memory heap usage, i.e. usage of memory heap 82 that (linearly) increases with time. In an embodiment, load balancer 70 identifies the applications running on virtual machine 80 under investigation, e.g., by checking log 72 or by communication with virtual machine 80. Load balancer 70 identifies the application types of these running applications, e.g., as stored in log 72, as obtained from the communication with virtual machine 80 or by checking register 74 upon determining the identity of the application executing on the virtual machine 80. Load balancer 70 investigates register 74 to determine forecasted memory usage of memory heap 82 by applications of this type, e.g., the overall memory heap usage by these applications upon execution completion by virtual machine 80.

The combined forecasted memory usage of memory heap 82 for the applications running of virtual machine 80 under investigation can be determined by summing all individual forecasted memory usages as retrieved from register 74, which, when deducted from the total size of memory heap 82 gives the available work volume of memory heap 82 of virtual machine 80 under investigation. Load balancer 70 typically performs this exercise for one or more virtual machines 80 to create a pool of one or more virtual machines 80 that have an available work volume exceeding the estimated or forecasted memory usage of the new application to be dispatched to one of the one or more virtual machines 80 and dispatches the new application to one of the one or more virtual machines 80 in the pool in step 115. Then the dispatch aspect of method 100 implemented by load balancer 70 terminates in step 117. In this manner, the risk that the dispatch of a new application to virtual machine 70 triggers a garbage collection is reduced due to the fact that new applications are only dispatched to virtual machines having sufficient available work volume in their respective one or more memory heaps 82.

In an embodiment, load balancer 70 may dispatch in the new application in step 115 to virtual machine 80 in the pool that has the largest available work volume in memory heap 82 of virtual machine 80. This is particularly good practice where the new application is of an application type previously absent in register 74 such that the estimate of the memory usage by the new application of the identified application type may be inaccurate, i.e. larger than estimated. Dispatching the new application to virtual machine 80 with the largest available work volume in memory heap 82 minimizes the risk of a garbage collection being triggered by a virtual machine 80 running out of available work volume in memory heap 82 due to a new application dispatched to virtual machine 80 by load balancer 70 requiring more memory than expected.

In an embodiment, the application types entries in register 74 may, in addition to the forecasted memory usage of the application type, comprise an indication of the duration of the execution of an application of the application type. Such an indication of duration may be used in a number of ways. For example, where virtual machine 80 executes one or more applications of an application type exhibiting dynamic memory heap usage, load balancer 70 may determine actual time Ta and the time of dispatch Ts (or time of start of execution if different) for such an application, as well as the memory heap usage Ma at Ta by that application. Ta, Ts, and Ma may be used by load balancer 70 to forecast the total memory usage MT by the application at point of completion of its execution by employing the algorithm: MT=Ma*D/(Ta−Ts) in which D is the total execution duration of the application type of the application as stored in register 74 (the situation in which Ta=Ts does not occur as the application is not yet in execution then).

In this manner, the available work volume VA may be calculated as VA=C−, wherein C is the capacity or overall size of memory heap 82 of virtual machine 80 and N is the number of applications in execution and queuing for execution of virtual machine 80. In this embodiment, a linear relation between execution progress and memory usage by an application is assumed, which is therefore less reliant on the accuracy of the forecasted memory usage stored in register 74 for each application type, as this parameter (forecasted memory usage) is not necessarily used in this alternative approach.

In an embodiment, the forecasted execution duration of an application of a particular type stored in register 74 is further used to determine if the new application can be executed by virtual machine 80 prior to a scheduled garbage collection from memory heap 82 of virtual machine 80. To this end, load balancer 70 checks in step 113 for each virtual machine 80 if the duration to a next scheduled garbage collection of memory heap 82 in each virtual machine 80, e.g., as retrieved from a garbage collection schedule for one or more virtual machines 80, exceeds the forecasted duration of the new application of the application type identified in step 111. If this is the case, the application may be added to the previously mentioned pool as there is minimal risk that the new application will be delayed by a scheduled garbage collection of memory heap 82 of one or more virtual machines 80. For the avoidance of doubt, it is noted that in this embodiment only virtual machine 80 having sufficient available work volume as well as sufficient duration until the next scheduled garbage collection are added to the pool.

Where the new application is of an application type not yet present in register 74 both the memory usage and the duration of the execution of an application of this application type may be added to register 74 in step 109 as explained above. The duration of the execution of an application of this application type may be estimated in any suitable manner. For instance, by identifying a comparable application type in the register and using the forecasted execution duration of an application of the comparable application type as an estimate of the execution duration of an application of the identified application type. Also, by averaging the forecasted execution durations of all or a subset of the application types in the register 74 as an estimate of the execution duration of an application of the identified application type, and so on. Other estimation approaches can be easily thought of by one of ordinary skill in the art. Once an estimate has been made of the memory usage by and the execution duration of an application of the identified application type, the new application type and its estimated memory usage and execution duration is added to register 74.

The data stored in register 74 may be improved by updating the register entries in register 74 based on monitoring memory usage and execution duration for those embodiments in which the execution duration is also recorded in register 74 for an application in execution on virtual machine 80. This will be explained in further detail with the aid of FIG. 4. After the start of method 100 in step 101, method 100 may proceed to step 131. Step 131 typically begins after termination of the dispatch aspect of method 100 in step 117, in which load balancer 70 monitors the memory usage of memory heap 82 and, where applicable, the duration of the execution of the application by virtual machine 80. For example, load balancer 70 may check memory heap 82 to determine which memory allocations are referenced by the application. Load balancer 70 may monitor memory heap usage by virtual machine 80. Virtual machine 80 may inform load balancer 70 of the memory heap usage on virtual machine 80 and so on. Alternatively, each virtual machine 80 may monitor the memory usage of memory heap 82 for each virtual machine 80 by a particular application and, where applicable, the duration of each virtual machine 80 executions of the application.

Upon determining the memory usage of memory heap 82 for a particular application and, where applicable, the duration of the execution of the application by virtual machine 80, load balancer 70 or virtual machine 80 checks register 74 in decision step 133 to identify the application type of the monitored application and compare the registered forecasted memory usage. Where applicable, the forecasted duration of the execution of the application against the actual memory usage (and execution duration) of the application of that application type as determined in step 131.

In an embodiment, the memory usage of memory heap 82 for a particular application is calculated by factoring in changes in the memory usage of other applications exhibiting dynamic memory usage during the execution of the application under consideration. For example, MT=WA(t2)−WA(t1)−, in which MT is the total usage of memory heap 82 by the application under consideration. WA(t2) is the available work volume in memory heap 82 at completion of the execution of the application under consideration. WA(t1) is the available work volume in memory heap 82 at the start of the execution of the application under consideration. Finally, ΔMi (t2−t1) is the change in heap memory usage for the other application of the N other applications in execution of virtual machine 80 during the execution of the application under consideration. This change in memory usage by such another application for instance may be estimated using the formula: $\Delta Mi\ (t2-t1)=Ma\ (t1)+(t2-t1)*[Ma(t1)/(t1-Ts)]$. Ma(t1) is the actual memory usage of this other application at the start of the execution of the application under consideration, and Ts is the execution start time of the other application, as previously explained. It should be understood that these are merely examples of how such memory usage may be calculated and that those of ordinary skill in the art will readily construct many other suitable algorithms for calculation such memory usage.

If the forecasted memory usage for the application type as stored in register 74 differs from the actual memory usage of the application of that application type (e.g., differs by an amount above a defined difference threshold) (yes branch, decision step 133), then method 100 proceeds to step 135 in which the entry of the identified application type in register 74 is updated using the actual memory usage determined in step 131. For example, replacing the forecasted memory usage with the actual memory usage or by performing some averaging of the forecasted memory usage and the actual memory usage (e.g., keeping track (in the register 74) of the number of times an application of that particular application type has been executed by virtual machine 80 and using this metric as a scaling factor in the averaging operation). In an example: $M\ (new)=(x*M\ (old)+Ma)/(x+1)$, wherein M (new) is the updated forecasted memory usage of the application type to be stored in register 74, M (old) is the previous forecasted memory usage of the application type stored in register 74, x is the number of previous executions of an application of that application type, and Ma is the determined actual memory usage of an application of that application type as determined in step 131.

Where applicable, where the forecasted duration of the execution of the application type as stored in register 74 differs from the duration of the execution of the application of that application type as determined in step 131. For example, where the forecast duration of execution differs from the actual duration of execution by an amount above a defined difference threshold, the method 100 may in step 135 update the entry of the identified application type in register 74 using the duration of the execution of the application of that application type as determined in step 131. In an example, replacing the forecasted duration of the execution with the actual duration of the execution or by performing some averaging of the forecasted duration of the execution and the actual duration of the execution (e.g., by keeping track, in register 74, of the number of times an application of that particular application type has been executed by virtual machine 80 and using this metric as a scaling factor in the averaging operation.) For example: $D\ (new)=(x*D\ (old)+Da)/(x+1)$, wherein D (new) is the updated forecasted duration of the execution of the application type to be stored in register 74, D (old) is the previous forecasted duration of the execution of the application type stored in register 74, x is the number of previous executions of an application of that application type, and Ma is the determined actual duration of the execution of an application of that application type as determined in step 131.

Where it is determined in decision step 133 that the forecasted memory usage for the application type as stored in the register 74 does not differ from the actual memory usage of the application of that application type, or differs by an amount below a defined difference threshold, the method 100 may skip updating of register 74 in step 135 and proceed directly to step 137 (no branch, decision step 133). In step 137 the application of which the execution is completed is removed from log 72 of active applications, i.e. applications in execution or queuing for execution. For example, by virtual machine 80 having completed this execution informing load balancer 70 accordingly, upon which load balancer 70 updates log 72. Alternatively, virtual machine 80 may update log 72, e.g. in case of maintaining its own log 72. This updating aspect from method 100 may subsequently terminate in step 139.

Returning to the dispatching aspect of the method 100, an embodiment of which is depicted in FIG. 3, load balancer 70 determines in step 113 for each virtual machine 80 the amount of volume that is available in memory heap 82 for each virtual machine 80. This information may be used in an embodiment to control garbage collection in selected memory heaps. This garbage collection aspect of method 100 will be explained in further detail with the aid of FIG. 5.

Upon determining the available work volume in step 113, as explained in more detail above, the method 100 proceeds to decision step 119 in which the load balancer checks if the available work volume of memory heap 82 is below a critical threshold. In an example, the size of the available work volume is too small to accommodate the execution of a new application. If this is the case, the method 100 proceeds to step 121 in which memory heap 82 and/or the associated one or more virtual machines 80 are made unavailable for consideration for dispatching new applications to that virtual machine 80 and shortlisted for garbage collection (yes branch, decision step 119).

Upon completing this shortlist, e.g., after evaluating the respective size of the available work volumes of memory heaps 82 of all of the one or more virtual machines 80, the method proceeds to step 123 in which a garbage collection operation is performed on one or more memory heaps 82 of the shortlisted one or more virtual machines 80. The exact implementation of the garbage collection operation is not particularly critical. The garbage collection operation may be performed sequentially on one or more memory heaps 82 of the shortlisted one or more virtual machines 80. At least some of the one or more memory heaps 82 of the shortlisted one or more virtual machines 80 may be grouped together with the garbage collection operation being performed on such a group and so on.

The garbage collection operation may be a simple operation in which only stale data objects are removed from memory heap 82 and remaining data objects optionally are regrouped. For example, to restore the contiguous nature of the data. If the remaining data objects are not regrouped, a more complex operation, such as a garbage collection on memory heap 82 divided into two areas (or generations) called the nursery (or young space) and the old or tenured space, in which the nursery is a part of memory heap 82 reserved for allocation of new data objects. When the nursery becomes full, garbage may be collected by running a special young collection, where all data objects that have lived long enough in the nursery are promoted (moved) to the old or tenured space, thus freeing up the nursery for more object allocation. When the tenured space becomes full garbage is collected from the tenured space. Such types of memory heap organization and garbage collection are well-known per se and it suffices to say that those of ordinary skill in the art would readily contemplate many suitable alternatives to the above non-limiting examples.

Upon completion of the garbage collection, the method 100, e.g., as implemented by load balancer 70, returns the shortlisted one or more virtual machines 80 to active duty in step 125 by making one or more virtual machines 80 available again for dispatching new applications to these one or more virtual machines 80, after which the garbage collection aspect of the method 100 terminates in step 127. It is noted that if the method 100 decides in step 119 that no virtual machine 80 has a memory heap 82 having an available work volume below the previously mentioned threshold, no immediate garbage collection is required and the method 100 may proceeds from step 119 directly to step 127 (no branch, decision step 119).

Figure 6:
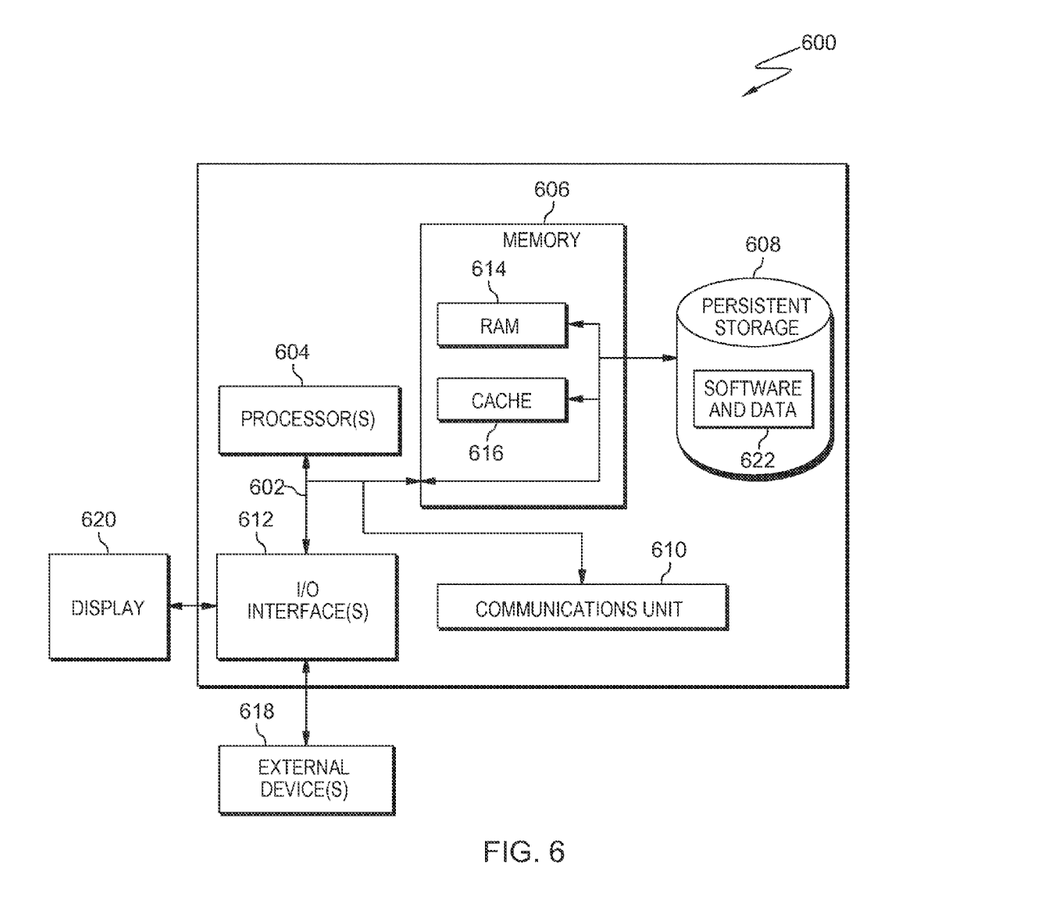
FIG. 6 depicts a block diagram of components of computing devices of FIG. 1, in accordance with an embodiment of the present invention.

FIG. 6 depicts a block diagram of components of computer 600, which is representative of computer system 40, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache 616. In general, memory 606 can include any suitable volatile or non-volatile computer readable storage media. Software and data 622 are stored in persistent storage 608 for access and/or execution by processor(s) 604 via one or more memories of memory 606. With respect to computer system 40, software and data 622 represents load balancer 70.

In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Software and data 622 may be downloaded to persistent storage 608 through communications unit 610.

I/O interface(s) 612 allows for input and output of data with other devices that may be connected to computer 600. For example, I/O interface(s) 612 may provide a connection to external device(s) 618, such as a keyboard, a keypad, a touch screen, and/or some other suitable input device. External device(s) 618 can also include portable computer readable storage media, such as, for example, thumb drives, portable optical or magnetic disks, and memory cards.

Software and data 622 can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a computer system, the method comprising:

estimating, by one or more computer processors, an amount of unused memory in a memory allocation of one or more virtual machines based on a data associated with one or more applications previously dispatched to the one or more virtual machines;

receiving, by one or more computer processors, a request for executing a new application;

estimating, by one or more computer processors, an amount of memory utilized by one of the one or more virtual machines to execute the new application, wherein estimating the amount of memory utilized by one or more virtual machines to execute the new application comprises:

maintaining, by one or more computer processors, a register of one or more previously executed types of applications comprising an indication of an amount of memory required by a virtual machine to execute the one or more application type;

identifying, by one or more computer processors, a first application type of the new application, wherein each application in the register is labeled with corresponding application type;

accessing, by one or more computer processors, the register to determine that the first application type exists in the register; and utilizing, by one or more computer processors, the amount of memory required by the one or more virtual machines to execute the first application type by averaging the memory usages of all of the one or more application types in the register as estimation for the amount of memory required by the one or more virtual machines to execute the new application;

identifying, by one or more computer processors, one or more virtual machines having an amount of unused memory exceeding the estimated amount of required memory to execute the new application;

dispatching, by one or more computer processors, the new application to one of the one or more virtual machine having an amount of unused memory exceeding the estimated amount of memory required to execute the new application; and updating, by one or more computer processors, the data associated with the one or more applications previously dispatched to the one or more virtual machines by adding an identifier of the new application to the data.

2. The method of claim 1, further comprising:
estimating, by one or more computer processors, a duration of the executing of the new application by one of the one or more virtual machines; and
determining, by one or more computer processors, a further duration before a next scheduled garbage collection.

3. The method of claim 1, wherein estimating, by one or more computer processors, an amount of unused memory in a memory allocation of one or more virtual machines based on a data associated with one or more applications previously dispatched to the one or more virtual machines comprises:
determining, by one or more computer processors, the amount of memory allocated to the one or more virtual machines;
predicting, by one or more computer processors, a usage of the memory allocation by the one or more applications previously dispatched to the one or more virtual machines; and
subtracting, by one or more computer processors, the predicted usage of the memory allocation by the one or more applications previously dispatched to the one or more virtual machines from the amount of memory allocated to the one or more virtual machines.

4. The method of claim 1, wherein dispatching, by one or more computer processors, the new application to one of the one or more virtual machine having an amount of unused memory exceeding the estimated amount of memory required to execute the new application comprises:
identifying, by one or more computer processors, one virtual machine of the one or more virtual machines with a largest amount of unused memory in the memory allocation of the one virtual machine of the one or more virtual machine; and
dispatching, by one or more computer processors, the new application to the identified one virtual machine.

5. The method of claim 1, further comprising making, by one or more computer processors, one virtual machine of the one or more virtual machines unavailable for the new application execution by assigning the one virtual machine to a garbage collection pool if the estimated amount of unused memory of the one virtual machine in the memory allocation of the one virtual machine is based on a log of applications previously dispatched to the one virtual machine and is below a defined threshold of memory needed for the new application.

6. The method of claim 5, further comprising:
performing, by one or more computer processors, a garbage collection on the one virtual machine in a garbage collection pool; and
making, by one or more computer processors, the one virtual machine in the garbage collection pool available for another new application execution by removing the one virtual machines from the garbage collection pool following performing the garbage collection on the one virtual machine in the garbage collection pool.

7. The method of claim 1, wherein maintaining a register of previously handled types of applications including, for each type, an indication of an amount of memory required by a virtual machine to execute the application type comprises maintaining a register of previously executed types of applications including, for each type, an indication of an amount of memory required by a virtual machine to execute the application type and an estimation of the duration of the execution of the application type by a virtual machine.

8. The method of claim 1, further comprising:
monitoring, by one or more computer processors, the actual amount of memory used by a virtual machine during execution of an application of a particular application type;
comparing, by one or more computer processors, the actual amount of memory used by a virtual machine during execution of an application of a particular application type with the indication of the amount of memory required by a virtual machine to execute the application type in the register; and
updating, by one or more computer processors, the indication of the amount of memory required by a virtual machine to execute the application type in the register with the actual amount of memory used by a virtual machine during execution of an application of a particular application type if the actual amount of memory used by a virtual machine during execution of an application of a particular application type is different to the indication of the amount of memory required by a virtual machine to execute the application type.

9. The method of claim 1, further comprising:
estimating, by one or more computer processors, an amount of memory required by a virtual machine to execute the application type if the application type does not exist in the register; and
adding, by one or more computer processors, the application type including the estimated amount of memory to the register.

10. A computer program product for managing a computer system, the computer program product comprising:
one or more computer readable storage media and program instructions stored on the one or more computer readable storage media, the program instructions comprising:
program instructions to estimate an amount of unused memory in a memory allocation of one or more virtual machines based on a data associated with one or more applications previously dispatched to the one or more virtual machines, wherein estimating the amount of memory utilized by one or more virtual machines to execute the new application comprises:
program instructions to maintain a register of one or more previously executed types of applications comprising an indication of an amount of memory required by a virtual machine to execute the one or more application type;
program instructions to identify a first application type of the new application, wherein each application in the register is labeled with corresponding application type;
program instructions to access the register to determine that the first application type exists in the register; and
program instructions to utilizing the amount of memory required by the one or more virtual machines to execute the first application type by averaging the memory usages of all of the one or more application types in the register as estimation for the amount of memory required by the one or more virtual machines to execute the new application;
program instructions to receive a request for executing a new application;

program instructions to estimate an amount of memory utilized by one of the one or more virtual machines to execute the new application;

program instructions to identify one or more virtual machines having an amount of unused memory exceeding the estimated amount of required memory to execute the new application;

program instructions to dispatch the new application to one of the one or more virtual machine having an amount of unused memory exceeding the estimated amount of memory required to execute the new application; and program instructions to update the data associated with the one or more applications previously dispatched to the one or more virtual machines by adding an identifier of the new application to the data.

11. The computer program product of claim 10, further comprising program instructions to:

estimate a duration of the executing of the new application by one of the one or more virtual machines; and determine a further duration before a next scheduled garbage collection.

12. The computer program product of claim 10, wherein program instructions to estimate an amount of unused memory in a memory allocation of one or more virtual machines based on a data associated with one or more applications previously dispatched to the one or more virtual machines comprises program instructions to:

determine the amount of memory allocated to the one or more virtual machines;

predict a usage of the memory allocation by the one or more applications previously dispatched to the one or more virtual machines; and subtract the predicted usage of the memory allocation by the one or more applications previously dispatched to the one or more virtual machines from the amount of memory allocated to the one or more virtual machines.

13. The computer program product of claim 10, wherein program instructions to dispatch the new application to one of the one or more virtual machine having an amount of unused memory exceeding the estimated amount of memory required to execute the new application comprises program instructions to:

identifying, by one or more computer processors, one virtual machine of the one or more virtual machines with a largest amount of unused memory in the memory allocation of the one virtual machine of the one or more virtual machine; and dispatching, by one or more computer processors, the new application to the identified one virtual machine.

14. The computer program product of claim 10, further comprising program instructions to make one virtual machine of the one or more virtual machines unavailable for the new application execution by assigning the one virtual machine to a garbage collection pool if the estimated amount of unused memory of the one virtual machine in the memory allocation of the one virtual machine is based on a log of applications previously dispatched to the one virtual machine and is below a defined threshold of memory needed for the new application.

15. The method of claim 14, further comprising program instructions to:

perform a garbage collection on the one virtual machine in a garbage collection pool; and make the one virtual machine in the garbage collection pool available for another new application execution by removing the one virtual machines from the garbage collection pool following performing the garbage collection on the one virtual machine in the garbage collection pool.

16. A computer system for managing a computer system, the computer system comprising:

one or more computer processors;

one or more computer readable storage media;

program instructions stored on the computer readable storage media for execution by at least one of the one or more computer processors, the program instructions comprising:

program instructions to estimate an amount of unused memory in a memory allocation of one or more virtual machines based on a data associated with one or more applications previously dispatched to the one or more virtual machines, wherein estimating the amount of memory utilized by one or more virtual machines to execute the new application comprises:

program instructions to maintain a register of one or more previously executed types of applications comprising an indication of an amount of memory required by a virtual machine to execute the one or more application type;

program instructions to identify a first application type of the new application, wherein each application in the register is labeled with corresponding application type;

program instructions to access the register to determine that the first application type exists in the register; and program instructions to utilizing the amount of memory required by the one or more virtual machines to execute the first application type by averaging the memory usages of all of the one or more application types in the register as estimation for the amount of memory required by the one or more virtual machines to execute the new application;

program instructions to receive a request for executing a new application;

program instructions to estimate an amount of memory utilized by one of the one or more virtual machines to execute the new application;

program instructions to identify one or more virtual machines having an amount of unused memory exceeding the estimated amount of required memory to execute the new application;

program instructions to dispatch the new application to one of the one or more virtual machine having an amount of unused memory exceeding the estimated amount of memory required to execute the new application; and program instructions to update the data associated with the one or more applications previously dispatched to the one or more virtual machines by adding an identifier of the new application to the data.

17. The computer system of claim 16, further comprising program instructions to:

estimate a duration of the executing of the new application by one of the one or more virtual machines; and determine a further duration before a next scheduled garbage collection.

18. The computer system of claim 16, wherein program instructions to estimate an amount of unused memory in a memory allocation of one or more virtual machines based on a data associated with one or more applications previously dispatched to the one or more virtual machines comprises program instructions to:

determine the amount of memory allocated to the one or more virtual machines;

predict a usage of the memory allocation by the one or more applications previously dispatched to the one or more virtual machines; and subtract the predicted usage of the memory allocation by the one or more applications previously dispatched to the one or more virtual machines from the amount of memory allocated to the one or more virtual machines.

19. The computer system of claim 16, wherein program instructions to dispatch the new application to one of the one or more virtual machine having an amount of unused memory exceeding the estimated amount of memory required to execute the new application comprises program instructions to:

identifying, by one or more computer processors, one virtual machine of the one or more virtual machines with a largest amount of unused memory in the memory allocation of the one virtual machine of the one or more virtual machine; and dispatching, by one or more computer processors, the new application to the identified one virtual machine.

20. The computer system of claim 16, further comprising program instructions to make one virtual machine of the one or more virtual machines unavailable for the new application execution by assigning the one virtual machine to a garbage collection pool if the estimated amount of unused memory of the one virtual machine in the memory allocation of the one virtual machine is based on a log of applications previously dispatched to the one virtual machine and is below a defined threshold of memory needed for the new application.

* * * * *